July 12, 1966   KENKICHI ITO ETAL   3,260,744
METHOD OF OPTICALLY RESOLVING RACEMIC AMINO ACIDS
Filed Oct. 9, 1963   3 Sheets-Sheet 1

INVENTORS
KENKICHI ITO
TAKEKAZU AKASHI
SUSUMU TATSUMI

BY
*Kurt Kelman*
AGENT

July 12, 1966    KENKICHI ITO ETAL    3,260,744
METHOD OF OPTICALLY RESOLVING RACEMIC AMINO ACIDS
Filed Oct. 9, 1963                                    3 Sheets-Sheet 2

INVENTORS
KENKICHI ITO
TAKEKAZU AKASHI
SUSUMU TATSUMI

BY

AGENT

INVENTORS
KENKICHI ITO
TAKEKAZU AKASHI
SUSUMU TATSUMI

AGENT

United States Patent Office 3,260,744
Patented July 12, 1966

3,260,744
METHOD OF OPTICALLY RESOLVING RACEMIC AMINO ACIDS
Kenkichi Ito, Midarebashi, Kamakura-shi, Kanagawa-ken, Takekazu Akashi, Kawasaki-shi, Kanagawa-ken, and Susumu Tatsumi, Kamakura-shi, Kanagawa-ken, Japan, assignors to Ajinomoto Co., Inc., Tokyo, Japan
Filed Oct. 9, 1963, Ser. No. 315,006
Claims priority, application Japan, Sept. 28, 1958, 33/27,649
12 Claims. (Cl. 260—534)

This is a continuation-in-part of our copending application Serial No. 840,052, filed September 15, 1959, now abandoned.

This invention relates to the optical resolution of racemic compounds whose crystals are conglomerates of optical isomers, and more particularly to the resolution of racemic amino acids whose crystals are conglomerates, such as glutamic acid and threonine.

It is known to preferentially remove one enantiomorph from a solution of a racemic compound forming conglomerate crystals by contacting the supersaturated solution of the racemate with seed crystals of the desired enantiomorph. Because of the presence of the crystals, the seeded enantiomorph tends to crystallize from the solution more rapidly than the optical antipode. Crystallization of the undesired antipode, however, is not suppressed by seeding, and racemate is admixed to the product obtained in the known processes. The amount of racemate and undesired antipode crystallizing was heretofore considered to be a function of time. The removal of the desired enantiomorph leaves the solution supersaturated with an amount of the undesired antipode which makes the mother liquor optically active, and will hereinafter be referred to as "free antipode."

The value of a resolution process for amino acids and other optically active materials is determined mainly by the optical purity of the product and by the output rate of optically active material. Because of the need for terminating crystallization of a seeded supersaturated racemate solution at an early stage and prior to crystallization of a significant amount of racemate or free undesired antipode, the processes employed heretofore had to reduce the output of the optically active material per unit time unless an optically relatively impure material was acceptable.

We have found that time as such is not the most important factor determining the purity of an optical isomer crystallized from a supersaturated racemate solution by means of seed crystals, but that the quality of the crystalline product depends critically on the composition change taking place in the liquid phase during selective crystallization of the desired enantiomorph. This crystallization correspondingly increases the concentration of the undesired enantiomorph in the free optically active form. When this concentration reaches or exceeds five percent of the combined amounts of dissolved racemic and optically active forms of the compound, the undesired enantiomorph crystallizes spontaneously at a rate sufficient to cause a severe reduction in the purity of the crystals produced.

If the composition changes in the liquid are held within the limits mentioned hereinabove, the dwell time of the supersaturated solution in the crystallization zone may be selected at will to suit other process conditions, and the dwell time of the seed crystals may be increased virtually indefinitely as far as is compatible with other requirements.

Since the output rate of optically active crystals is closely related to the dwell time of the solution in the crystallization zone, and to the dwell time of the seed crystals which in turn determines the size to which the seed crystals may grow, the above finding permits a continuous process to be developed in which the requirements of high purity and high output can be met simultaneously without any need for compromising one desired factor to improve the other.

The object of this invention thus is a process for the optical resolution of racemate solutions which provides optically very pure enantiomorphs at a high rate of output.

Another object is a process in which the output per unit volume of the apparatus is high.

With these and other objects in view, the process of the invention mainly consists in selectively keeping seed crystals of a desired enantiomorph in contact with a supersaturated racemate solution in a crystallization zone, whereby a portion of the desired enantiomorph crystallizes on the seed crystals, and continuously replenishing the solution in the crystallization zone at such a rate that the concentration of free undesired enantiomorph remains below a limit of five percent of the combined amounts of dissolved racemate and optically active material.

When this condition is met, the seed crystals grow by precipitation of a material which consists of practically pure desired enantiomorph. The undesired enantiomorph remains in stable solution in a solution containing the large excess of racemate. Spontaneous crystallization of the racemate and of the undesired free antipode can be held to an insignificant amount.

The process according to the invention permits to operate with solutions which are highly supersaturated prior to contact with the seed crystals, and from which the desired enantiomorph is therefore crystallized at high rates. The manner in which the supersaturated racemate solutions are produced is not in itself relevant to this invention, and all the known methods of producing supersaturated solutions may be employed prior to crystallization.

The replenishment of the mother liquor which has lost some of the desired enantiomorph in the crystallization zone is performed by continuously adding supersaturated racemate solution to the zone, and withdrawing the mother liquor at the same rate. The fresh racemate solution may be fed to the crystallization zone from above or from below, and the partly spent mother liquor may be removed from the top of the zone, as by overflow. The growing seed crystals are prevented from leaving the zone with the mother liquor whose composition is not very different from that of the original fresh solution.

The fresh racemate solution may be fed to the crystallization zone from below at such a rate that it keeps the seed crystals freely suspended in the flowing stream of liquid as a fluidized bed of solid particles as long as the size of the crystals is such as to give them a settling velocity of the same magnitude as the upward flow velocity of the liquid in which they are suspended. A bed of fluidized particles having a clearly defined top is formed under such conditions. The upward rate of liquid flow changes abruptly at the level of this top. Seed crystals growing to a size too large for suspension in fluidized condition collect at the bottom of the crystallization zone and may be withdrawn from there at any desired time. The period during which seed crystals are in the crystallization zone is not limited by considerations of purity of the crystals obtained.

Alternatively, we provide contact between the seed crystals and the racemate solution by mechanical agitation. The location at which fresh racemate solution is fed to the crystallization zone is not critical with adequate agitation which maintains a substantially uniform composition of the solution throughout the zone. Conventional mixing tanks equipped with an agitation device such as a stirrer operating at sufficient speed are suitable. An overflow provided for withdrawal of the solution at the same rate at which liquid is being fed to the tank is preferably equipped with a screen for preventing the escape of seed crystals and for separating them from the discharged liquid. The composition change of the solution in the crystallization zone is made small enough to prevent spontaneous crystallization of the undesired antipode on a significant scale.

The overflowing mother liquor containing the free other antipode is supersaturated at least with respect to the latter and may be contacted in a second crystallization zone with seed crystals of the other antipode for selective recovery thereof. Enrichment with additional amounts of racemate may precede the second crystallization which is performed in the same manner as the first crystallization. The overflowing mother liquor from the second crystallization zone may be returned to the first zone after enrichment with racemate if necessary, or fed to a third crystallization zone in which crystallization of the same enantiomorph as in the first zone may be performed under the same or different conditions. The mother liquor from the third crystallization zone may be further processed in the second crystallization zone or fed to a fourth zone for crystallization of the same enantiomorph as in the second zone. The liquid may thus be continuously circulated through two or more crystallization zones in which the several enantiomorphs are selectively crystallized whereas the solution is being enriched with racemate at suitable points of the closed circuit.

The grown seed crystals may be removed from the process at any time in any desired manner, and circulation of the liquid may be stopped for removal of the crystals. The grown crystals are uniformly of large size, and readily separated from the mother liquor by decantation or centrifuging.

The use of a plurality of tanks, each enclosing a crystallization zone permits crystallization to be carried out at a high rate without at any time building up a high concentration of an undesired antipode in any zone. The process can be carried out continuously over a long period of time under stable conditions. Both enantiomorphs are recovered as crystals substantially free of the other enantiomorph.

Other features and many of the attendant advantages of this invention will be readily appreciated as the same becomes better understood by reference to the following detailed description when considered in connection with the accompanying drawings which illustrate preferred equipment for carrying out the process of the invention, and in which.

Figure 6:
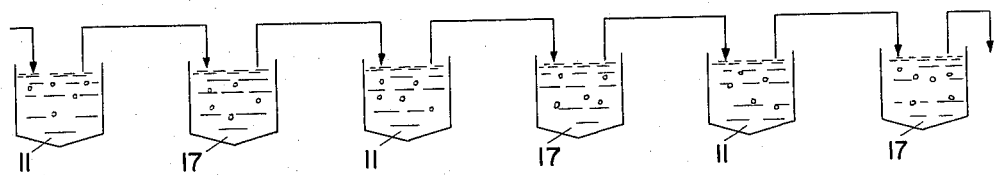
Figure 7:
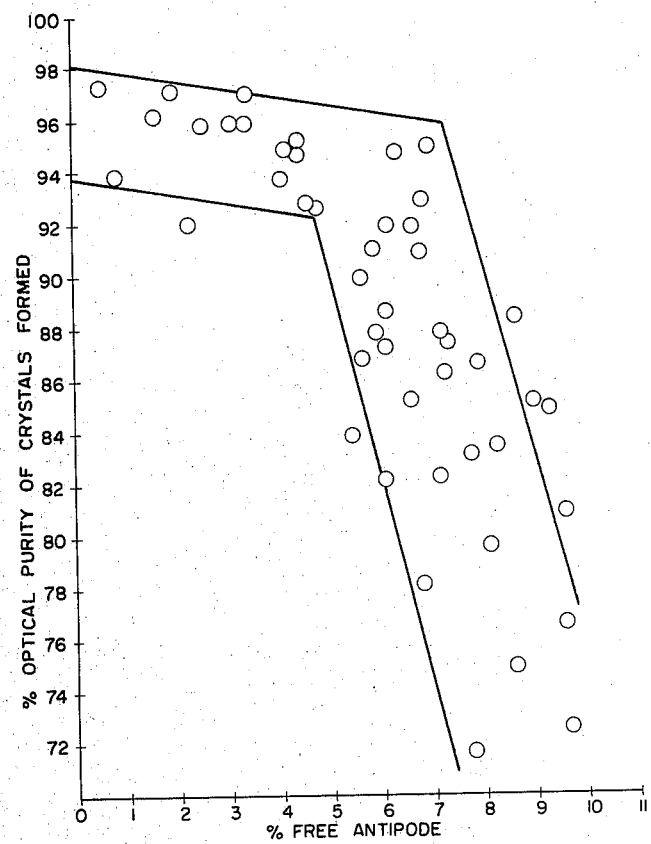

FIG. 6 diagrammatically illustrates a second arrangement of this type;

FIG. 7 is a graph illustrating the relationship between the purity of the crystallized desired enantiomorph and the concentration of the undesired enantiomorph in the mother liquor.

Figure 1:
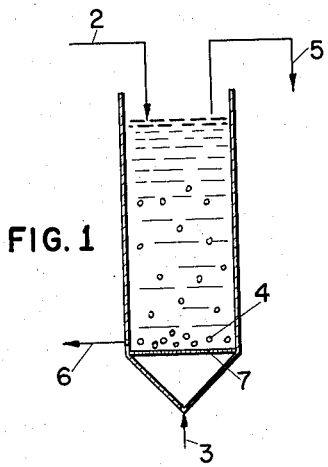
FIG. 1 shows a column for contacting a supersaturated racemate solution with a fluidized bed of seed crystals, the column being shown somewhat diagrammatically in elevational section on its axis.

Referring now to the drawing in detail, and initially to FIG. 1, there is shown a vertically elongated cylindrical column 1 having an open top and a funnel shaped bottom. Seed crystals of selected size are fed to the open top of the column 1 as indicated by the arrow 2. They consist of the enantiomorph which it is desired selectively to crystallize in the column. Supersaturated solution of the racemate is fed to the bottom of the column as indicated by the arrow 3 at a rate sufficient to hold at least a portion of the crystals 4 in the column in fluidized suspension. A mother liquor is permitted to overflow the top of the column as indicated by the arrow 5. The mother liquor contains unresolved racemate and an amount of the undesired enantiomorph in the free form which corresponds to the amount of desired enantiomorph deposited on the seed crystals. As the seed crystals grow, they cannot be kept fluidized by the flowing liquid, and drop to a screen bottom 7 in the column from which they are withdrawn from time to time as indicated by the arrow 6 to prevent clogging of the column, to hold the amount of seed crystals in the column between 25 and 45 percent of the combined volume of the crystals and of the liquid, and to keep the seed surface and the number of seeds substantially uniform.

If any solid nuclei of the undesired enantiomorph or of the racemate should form in the crystallization zone within the column 1 by a localized increase in the concentration of the free undesired enantiomorph, they are swept out of the zone by the flowing mother liquor. When the concentration of the undesired free antipode in the crystallization zone does not exceed five percent of the total amount of dissolved material in the liquid, visible crystals do not form at the flow velocities discussed hereinafter.

The crystals withdrawn at 6 are very pure, and approach an optical purity of 100 percent. Their growth is rapid since they may be grown safely in a solution which is highly supersaturated with respect to the racemate. The large crystals recovered are readily washed free of adhering mother liquor; and may be partly returned to the process as seed crystals after partial dissolution of their outer layer in water which may be made acid or alkaline. The crystals are thereby reduced to the desired size suitable for fluidization. The recovered crystals may also be crushed and screened to select a fraction having the desired particle size. This fraction then is employed for seeding.

The size of the seed crystals must be correlated with the linear upward velocity of the liquid in the column 1 in such a manner that this velocity is smaller than the terminal settling velocity of the smallest seed crystals supplied. The velocity of upward liquid flow must be at least 10 percent of the terminal settling velocity of the largest seed crystals that it is desired to keep in the fluidized bed or layer of seed crystals. Any crystals which grow to a terminal settling velocity greater than the flow velocity of the liquid drop to the column bottom. For stable operation, the upward fluid velocity should be between 20 percent of the terminal settling velocity of the largest seed crystals to be maintained fluidized in the crystallization zone and 60 percent of the terminal settling velocity of the smallest seed crystals supplied.

The portion of the crystallization zone occupied by the fluidized seed crystals should be less than 60 percent, and preferably between 25 and 45 percent so as to permit any nuclei of the undesired antipode to be freely swept from the crystallization zone. The concentration of seed crystals is controlled by the flow rate of the liquid. A bed of crystals of desired concentration is maintained in the crystallization zone when the terminal settling velocity of the seed crystals in the supersaturated racemate solution is at least 0.2 meter per minute, and preferably between one meter per minute and four meters per minute while the velocity of upward solution flow is between 20 percent of the terminal settling velocity of the largest crystals and 60 percent of that of the smallest crystals.

Bodies of material insoluble in the aqueous racemate solution and externally coated with the desired enantiomorph may be substituted in part or entirely for seed crystals of corresponding settling velocity. The coating may be formed by adhesively fastening dry powder of the desired enantiomorph to the surface or by drying a solution of the enantiomorph on the surface of the insoluble bodies which may consist of clay, rubber, or plastics.

The degree of supersaturation of the racemate solution fed to the column should be as high as possible. Although selective crystallization of the desired enantiomorph takes place at any degree of supersaturation, even at 0.1 percent supersaturation, crystallization, at a practical rate requires a supersaturation of at least one percent. A supersaturated solution of the racemate in water is prepared in any known manner. If the racemate is an amino acid, a supersaturated solution may be formed, for example, by cooling of a hot saturated solution or by a change in the hydrogen ion concentration. Amino acids have distinct peaks of solubility at specific pH values of their aqueous solutions. A solution prepared at a pH corresponding to a peak in solubility becomes supersaturated upon addition of any substance more acid or more alkaline.

In the specific case of glutamic acid, a solution supersaturated with respect to DL-glutamic acid may be prepared by adding DL-glutamic acid monohydrate to a saturated aqueous solution of anhydrous racemic glutamic acid or by keeping such a saturated solution in contact with a solid phase of the monohydrate. It is thereby possible preferentially to crystallize an optically active form of anhydrous glutamic acid on seed crystals of the optically active acid from a saturated solution of the corresponding racemate by adding crystals of the racemic monohydrate to that solution in the crystallization zone.

The degree of supersaturation of the racemate fed to the crystallization zone is preferably held constant for continuous operation, and the temperature distribution in the crystallization zone also should be constant. It is more readily possible to operate at temperatures above room temperature than at or below room temperature, and operating temperatures of the column illustrated in FIG. 1, are therefore normally between 20° C. and 80° C., and preferably between 30° and 70° C.

The following examples are further illustrative of the process of the invention as carried out in apparatus of the type shown in FIG. 1, and it will be understood that the invention is not limited thereto.

*Example 1*

Water at 60° C. was saturated with DL-glutamic acid, and then heated to 65° C. in a storage tank. The solution contained 7% glutamic acid and was continuously fed at a rate of 2.4 liters per hour from the storage tank to a resolution column through a cooling tube in which the solution temperature was reduced to 50° C. The resolution column had a diameter of 10 millimeters, and a height of 1500 millimeters. It was kept at 50° C. The supersaturated solution was fed to the lower end of the column, and was permitted to overflow from the top.

The column contained 10.2 grams seed crystals of L-glutamic acid having a terminal settling velocity of 1.0 to 1.3 meters and a specific rotation $[\alpha]_D^{22} = +31.3°$. The flow rate of the racemate solution was set to keep the crystals initially suspended in a fluidized bed. A small amount of grown seed crystals was withdrawn from the bottom of the column every 30 minutes, and a sufficient amount of fresh seed crystals was fed to the top of the column to maintain the percentage of crystals in the flowing solution between 25 percent and 45 percent. The overflowing liquid contained an amount of free D-glutamic acid corresponding to 4.5% of the total glutamic acid present.

The withdrawn crystals were washed once with water. After two hours, the process was stopped, the remaining crystals were removed from the column, and washed with water. The combined crystals weighed 41.7 grams and had a specific rotation of $[\alpha]_D^{22} = +30.9$. The total amount of seed crystals added had been 25.6 grams, and the yield of pure L-glutamic acid in two hours' operation thus was 15.3 grams. The purity of the additionally crystallized L-glutamic acid was 95%.

When the process was repeated in substantially the same manner, but using seed crystals of D-glutamic acid, 40.0 grams D-glutamic acid crystals of $[\alpha]_D^{22} = -29.7°$ were recovered after seeding with 22.5 grams crystals of $[\alpha]_D^{22} = -31.1°$. The yield of pure D-glutamic acid thus was 15.2 grams, and the purity of the crystallized material 87%.

The nominal specific rotation of pure L- or D-glutamic acid in 2 N HCl is $[\alpha]_D^{22} = +32.0°$, and the results reported in this example and in the following ones are based on these values.

*Example 2*

Water was saturated with DL-glutamic acid at pH 4.5 and 78° C. to a concentration of 33 percent. The solution was stored in a tank at 80° C. It was fed in a continuous stream of 2.4 liters per minute through a cooling tube to the column described in Example 1. The column was kept at an operating temperature at 70° C. and the racemate solution was cooled to that temperature before entering the column.

The column was provided with seed crystals of L-glutamic acid as described in Example 1, and the crystals were kept in suspension by the flowing racemate solution. The optical activity of the overflowing solution indicated the presence of D-glutamic acid in an amount corresponding to one percent of the total glutamic acid. The total time of operation was 80 minutes. Grown crystals were withdrawn and fresh seed crystals were added at intervals of 20 minutes. The total amount of seed crystals supplied was 20.9 grams, and the combined amounts of L-glutamic acid crystals recovered were 32.8 grams with a specific rotation of $$[\alpha]_D^{22} = +31.0°$$

The amount of pure L-glutamic acid crystallized in the 80 minute period thus was 11.4 grams and the purity of the newly crystallized material 95%.

D-glutamic acid was obtained in an analogous manner. Seed crystals originally weighing 21.2 grams grew to a combined weight of 32.7 grams. The seed crystals were of the same composition as the seed crystals of D-glutamic acid employed in Example 1, and the product had a specific rotation of $[\alpha]_D^{22} = -30.1°$. The pure D-glutamic acid content of the crystals formed during the eighty minute period thus was 10.2 grams.

*Example 3*

An aqueous solution of DL-glutamic acid was saturated at pH 4.3 at 45° C. so that it contained 12 percent of the acid. It was stored in a tank at 50° C., and cooled to 30° C. while being fed in a continuous stream of 7.3 liters per hour to the bottom of the aforedescribed column which was held at 30° C. In two successive runs of two hours, L- and D-glutamic acid were precipitated on respective seed crystals in the manner described in the preceding examples. The concentration of the undesired free enantiomorph in the overflowing liquid was held to approximately 0.8% of the total glutamic acid content. The L-glutamic acid seed crystals which initially had a terminal settling velocity of 3.5 to 4 meters per minute grew from 28.5 grams to 45.5 grams, and the product had a specific rotation of $[\alpha]_D^{22} = +30.9$ for a net yield of 16.0 grams pure L-glutamic acid. The D-glutamic acid seed crystals of similar original size grew from 27.7 grams to 44.8 grams, and had a final specific rotation of $[\alpha]_D^{22} = -30.6°$ for a net yield of 15.9 grams pure D-glutamic acid.

Example 4

An aqueous solution of DL-glutamic acid saturated at 50° C. and a concentration of five percent was fed to the bottom of a column of 2.5 centimeter diameter at a rate of 214 grams per minute. The column was being held at 50° C., and simultaneously received 43 grams per minute of a 22.6 percent solution of DL-glutamic acid hydrochloride and 42.4 grams per minute of a 21.3 percent solution of DL-monosodium glutamate. Seed crystals of L-glutamic acid were kept in suspension in the column by the flowing liquid mixture, and the largest crystals dropping to the bottom of the column were withdrawn from time to time and replaced by additional fresh seed crystals fed from the top. The overflowing solution contained 0.45% of the glutamic acid present in the form of the free unwanted enantiomorph. The continuous supply of racemate solutions and the intermittent addition of fresh seed crystals and withdrawal of grown seed crystals were carried out for two hours as described in Example 1. The total amount of seed crystals supplied for the run was 25.6 grams, and the crystals recovered weighed 42.2 grams and had a specific rotation of $[\alpha]_D^{22}=+30.6°$. The net yield of pure L-glutamic acid thus was 15.0 grams.

Example 5

An aqueous solution of DL-threonine saturated at 60° C. at a concentration of 25% was stored at 65° C. It was continuously fed from the storage tank to the aforedescribed column at a rate of 12 liters per hour through a cooling tube in which the temperature of the solution was lowered to the 50° C. operating temperature of the column. The supersaturated solution formed was contacted in the column in two successive runs with two respective beds of seed particles fluidized by the flowing racemate solution for periods of two hours each. The concentration of the unwanted enantiomorph in the overflowing solution was kept at three percent of the total threonine present, and the overflow was returned to the storage tank.

The seed particles were prepared by dipping two batches of clay particles having a size of 12 to 16 mesh in supersaturated solutions of D- and L-threonine respectively for a long time, and then withdrawing and drying the clay particles whose surfaces were thereby coated with optically active threonine crystals. The coated particles were washed with 95% ethanol, and again dried.

After use as crystallization seeds, the clay bodies with their heavy deposit of optically active threonine were treated with water to separate the amino acid coating from the clay. The L-threonine grew from 20.5 grams at $[\alpha]_D^{22}=-28.0°$ to 33.2 grams at $[\alpha]_D^{22}=-27.7°$. The yield of pure L-threonine was therefrom calculated to be 12.2 grams. The D-threonine on the second batch of clay bodies grew from 19.8 grams at $[\alpha]_D^{22}=+28.1°$ to 32.5 grams at $[\alpha]_D^{22}=+27.7°$ for a yield of 12.1 grams pure D-threonine.

The above calculations are based on a nominal specific rotation of $[\alpha]_D^{22}=\pm28.3°$ for L- and D-threonine respectively.

In the several runs of Examples 1 to 5, the concentration of the undesired enantiomorph in the overflowing mother liquor never exceeded 5 percent of the total amount of glutamic acid or threonine present.

Figure 2:
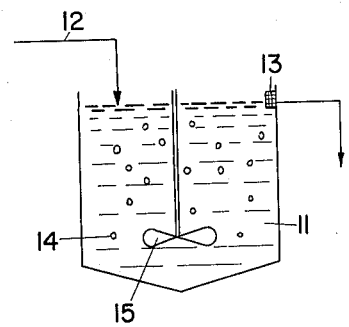
FIG. 2 shows a tank equipped with a stirrer for contacting a supersaturated racemate solution with seed crystals held in suspension by mechanical means, the view corresponding to that of FIG. 1.

Referring now to FIG. 2 of the drawing, there is seen a generally cylindrical tank 11 having a conical bottom and equipped with a conventional propeller-shaped agitator 15 mounted and driven at high speed in a manner entirely conventional and not further illustrated. The tank 11 is filled with a supersaturated solution of a racemic amino acid which is continuously supplied at the top of the tank 11 through a pipe 12. Seed crystals 14 of the desired enantiomorph are kept suspended in the tank by the agitator 15. The liquid contents of the tank overflow at the top through a screen 13 which retains the crystals 14.

The overflow rate is inherently equal to the supply rate of the replenishing solution, and the rate of replenishment is controlled in such a manner that the liquid overflowing through the screen 13 contains an amount of the free undesired enantiomorph which is less than five percent of the total amount of amino acid present.

If any nuclei of the undesired enantiomorph should form in the tank 11, they are swept through the screen 13 by the flowing liquid.

Figure 3:
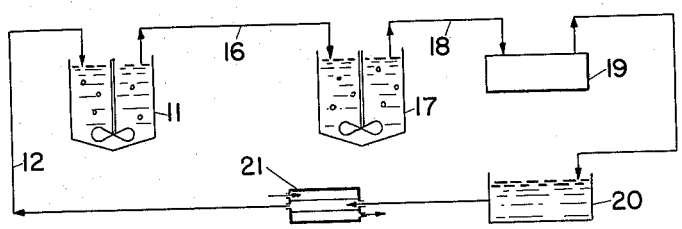
FIG. 3 is a flow diagram of a first arrangement combining two devices of the types illustrated in FIG. 2.

The manner in which two tanks of the type illustrated in FIG. 2 may be combined into a single operating unit is illustrated in FIG. 3. The liquid overflowing from the tank 11 is fed through a line 16 into a second tank 17 identical in all respects with the tank 11, but provided with seed crystals of the undesired enantiomorph. The liquid overflowing from the tank 17 is led through a conduit 18 to a saturator tank 19 where it is enriched with additional solid racemate. The enriched solution is then pumped to a storage tank 20 from which it is returned to the tank 11 through a cooling tube 21 and the pipe 12.

Because the ratio of seed crystals to liquid is not critical in the embodiments of the invention based on agitator-equipped tanks of the type shown in FIG. 2, frequent withdrawal of seed crystals grown beyond a desired size and feeding of fresh smaller crystals is unnecessary. The apparatus may be operated continuously for a long period, and crystals may be permitted to grow for the entire period of the run. Circulation is then stopped, and the large crystals of fairly uniform size are easily removed and further processed.

The use of two tanks arranged in tandem in a closed cycle or otherwise permits economical operation with a minimum change of concentration of the desired enantiomorph during each passage through the crystallization zone in a tank. The removal rate of the desired enantiomorph is directly proportonal to the concentration of the undesired enantiomorph in the overflowing mother liquor, and that concentration therefore can readily be held well below the limiting value of five percent without affecting the economics of the process.

Figure 4:
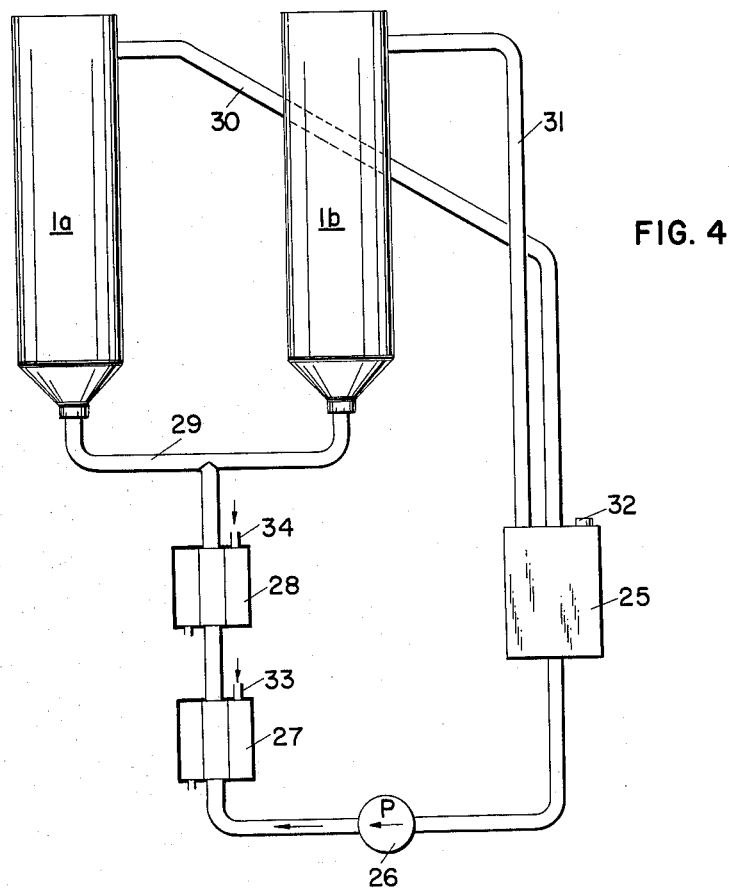
FIG. 4 shows another arrangement of the invention combining two devices of the type shown in FIG. 1 the view being generally in elevation, with portions of the apparatus broken away to illustrate internal structure.

Another apparatus combining two crystallization vessels of the invention for simultaneous removal of two optical enantiomorphs from a racemate solution is illustrated in FIG. 4. The apparatus includes two identical columns 1a, 1b of the type shown in FIG. 1. They are supplied with a supersaturated racemate solution from a common supply system including a mixing tank 25, a pump 26, two heat exchangers 27, 28, and a manifold supply pipe 29. Respective overflow pipes 30 and 31 lead from the columns 1a, 1b to the mixing tank 25. A removable cover 32 permits solid materials to be introduced into the tank 25 which will be understood also to contain a conventional heating coil and an agitator, not illustrated.

The heat exchanger 27 has a jacket 33 into which steam may be admitted to heat material supplied by the pump 26. The jacket 34 of the heat exchanger 28 may be similarly supplied with cooling water. Both heat exchangers are equipped with thermostatic devices (not shown) which control the flow of steam and water respectively to maintain the effluent pumped liquid at a fixed desired temperature. The manner of operation of this device will be evident from the following example.

Example 6

Racemic glutamic acid crystals were fed to the tank 25 at a rate of 1200 grams per hour, and mixed therein with liquid returned from the columns 1a and 1b through the overflow pipes 30, 31. The resulting slurry was pumped into the heat exchanger 27 by the pump 26 at a rate of 3.4 liters per minute. The heat exchanger was set for an effluent temperature sufficiently above 55° C. to ensure complete solution of the glutamic acid crystals.

The actual temperature of the effluent was not measured, and is not critical.

The homogeneous hot solution was cooled in the heat exchanger 28 to 55° C. at which temperature it was supersaturated, having a glutamic acid concentration of 13 percent and a pH of 4.0. The supersaturated solution was fed to the two columns 1a, 1b from the respective bottoms at the same rate while the temperature in the columns was maintained at 55° C. Each column had a diameter of 4 centimeters and a height of 150 centimeters and contained initially 600 grams seed crystals of optically active glutamic acid having an optical puritp of 95%, and a settling velocity of 3.5 to 4 meters per minute, one column containing L-glutamic acid, and the other D-glutamic acid.

The feeding of racemate crystals and the circulation of the solution were continued for three hours. The concentration of the undesired antipode in the overflowing mother liquors in pipes 30 and 31 was approximately constant at 3.6 percent of the total glutamic acid present throughout the run. When operations were terminated, 2.3 kilograms of crystalline L-glutamic acid and 2.4 kilograms of crystalline D-glutamic acid were recovered from the columns 1a and 1b respectively. Both products had an optical purity of 95 percent.

Figure 5:
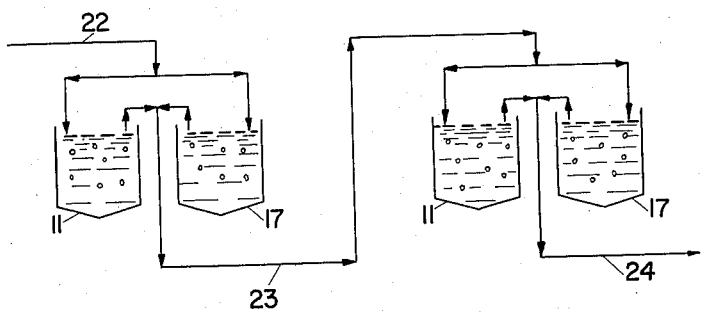
FIG. 5 is a flow diagram of another arrangement combining more than two tanks.

Arrangements combining more than two crystallization vessels in a single unit are shown by way of example in FIGS. 5 and 6, and other combinations of crystallization zones will readily suggest themselves to those skilled in the art on the basis of these teachings.

FIG. 5 shows an arrangement of two batteries, each consisting of a tank 11 and a tank 17 respectively holding seed crystals of the L-enantiomorph and the D-enantiomorph of the amino acid which it is desired to resolve into its optical antipodes. The two tanks receive a supersaturated racemate from a manifold pipe 22, and the mother liquors overflowing from them are received in a common conduit 23. The tanks 11 and 17 are operated under the same conditions so that the amounts of undesired antipodes discharged by them are substantially equal. The combined mother liquors thus are free of optical activity. They are still supersaturated and are fed jointly to a second battery of one tank 11 and one tank 17 connected and operated in the same manner as described with reference to the first battery. Their combined effluent is carried by a mixing pipe 24 to additional batteries, or it is returned to the first battery through a saturator and storage tank in a manner that will be obvious from the showing of FIG. 3.

FIG. 6 illustrates an arrangement, in which alternating tanks 11 and 17 are arranged in a series including four tanks arranged in series. The overflowing mother liquor of the first tank 11 is fed to the first tank 17, and the overflowing liquor of the latter to the second tank 11, and so forth, until the liquid originally supplied has passed through each of three tanks 11 and three tanks 17. These tanks may be operated at gradually diminishing temperatures to maintain the desired supersaturation of the liquid, or saturators operating at higher temperatures may be interposed between adjacent tanks. The effluent of the last tank 17 may be returned to the first tank 11 in the manner shown in FIG. 3.

While FIGS. 5 and 6 illustrate resolution units of the invention employing multiple tanks of the type shown in FIG. 2, and while the use of such tanks is preferred in these units, it will be understood that columns containing fluidized beds of seed crystals in the manner shown in FIG. 1 may be substituted for some or all of the tanks 11, 17 illustrated in FIGS. 5 and 6.

The rate of crystallization of the desired enantiomorph is greatly improved and agglomeration of the crystals is prevented by a rate of agitation sufficient to keep all seed crystals present in suspension. Other things being equal, the crystallization rate increases with the amount of crystals in the tank and with their surface area. Because of the need for adequate agitation, it is not normally practical to operate a crystallization tank equipped with a mechanical agitator with a mass of crystals occupying more than 40 percent of the tank space. Above this limit, the rate of crystallization falls off because of the difficulty in obtaining homogeneous mixing. For the largest specific surface area consistent with convenient screening of the overflow conduit, the seed crystals in a mechanically agitated crystallization vessel should have a terminal settling velocity between 0.6 and twelve meters per minute. It will be noted that these limits are very much wider than those advisable in columns having a fluidized bed of seed crystals as illustrated in FIG. 1.

The seed crystals recovered after growth may be partly dissolved or crushed for producing a new batch of seed crystals for a succeeding run, as has been described with reference to the operation of the apparatus of FIG. 1. As has been described there, insoluble bodies coated with optically active material may serve as seed bodies.

The following examples more specifically illustrate the operation of crystallization vessels of the type shown in FIGS. 2, 3, 5, and 6.

*Example 7*

A solution saturated with DL-glutamic acid at 60° C. and pH 4.3 and containing 20 percent of the acid was prepared by adjusting the pH of an aqueous racemic glutamic acid solution with sodium hydroxide. The solution was circulated at a rate of two liters per minute in a system consisting of two six-liter tanks of the type shown in FIG. 2 and arranged in parallel in the manner of FIG. 4, and in series with two heat exchangers, a mixing tank, a pump, and connecting conduits. Each tank was equipped with a mechanical stirrer, and was kept at 55° C.

Each tank initially contained 500 grams seed crystals of D- and L-glutamic acid respectively, the crystals having an optical purity of 98% and terminal settling velocities in the supersaturated racemate solution between 3.6 and 4.7 meters per minute (30 to 35 mesh). Racemic glutamic acid crystals were added to the circulating solution at the rate of 600 grams per hour at the mixing tank. The saturated solution discharged from the heating tube at 70° C. was passed through the cooling tube from which it emerged at 55° C., and was pumped into both crystallization tanks. Their combined overflow was fed to the mixing tank.

During seven hours operation the concentration of undesired free antipode in the solution overflowing from the crystallization zone in each tank was kept at or below 2 percent of the total glutamic acid present. The crystals of D- and L-glutamic acid accumulated in the respective tanks were then separated from adhering mother liquor by centrifuging, and dried. Two batches of 26 kilograms each were recovered. The crystals of D-glutamic acid had a specific rotation of $[\alpha]_D^{20}=-30.3$, corresponding to an optical purity of 94.5 percent when based on a specific rotation of the pure acid of $[\alpha]_D^{20}=-32.0°$. The specific rotation of the L-glutamic acid crystals was $[\alpha]_D^{20}=+30.6°$, corresponding to an optical purity of 95.3 percent.

Similar results were obtained when seed crystals having terminal settling velocities between approximately nine and twelve meters per minute were employed.

*Example 8*

Two 425 gram batches of 20 mesh rubber grains having a terminal settling velocity of approximately 7 meters per minute were respectively immersed in aqueous solutions of D- and L-glutamic acid of 93% optical purity, withdrawn and dried to coat each rubber grain with a crystalline coating of optically active glutamic acid. This sequence of operations was repeated until the combined coatings deposited on each batch weighed 75 grams. The coated rubber particles were employed as seed bodies in the apparatus described in Example 7 in a run which differed from that described in Example 7 by the addition of racemic glutamic acid to the circulating solution at a rate of 300 grams per hour, by a total operating time of five hours, and a maximum concentration of undesired antipode in the tanks and in the overflowing liquids of one percent.

The amounts of D- and L-glutamic acid respectively recovered weighed 823 grams and 820 grams. They had specific rotations $[\alpha]_D^{20} = -29.6°$ (optical purity of 92.5%) and $[\alpha]_D^{20} = +29.1$ (optical purity 91.0%).

*Example 9*

The process of Example 8 was repeated with seeds prepared by coating grains of an inert synthetic plastic coated with optically active glutamic acid. The D- and L-glutamic acid employed had each an optical purity of 98 percent. The plastic grains had the same average settling velocity as the rubber grains employed in the earlier example, and each batch of plastic grains was coated with 115 grams of the respective optically active material.

The two batches of D- and L-glutamic acid recovered after the run each weighed 858 grams. Their specific rotations were respectively $[\alpha]_D = -30.8°$ and $[\alpha]_D^{20} = +30.5°$, corresponding to optical purities of 96.3 and 95.3 percent. The concentration of free undesired antipode in both crystallization zones was kept at approximately one percent throughout the run.

*Example 10*

An aqueous solution saturated with 50 percent racemic glutamic acid hydrochloride at 50° C. was cooled to 45° C. and contacted at that temperature with seed crystals of D- and L-glutamic acid hydrochloride in an apparatus closely similar to that referred to in Example 7. Racemic glutamic acid hydrochloride was fed to the circulating liquid at the rate of 400 grams per hour. The seed crystals in each tank weighed 500 grams, and had a terminal settling velocity between 3.6 and 6 meters per minute. The concentration of free undesired antipodes in the crystallization tanks was held at about 0.5 percent of the total glutamic acid present.

1.10 kilograms of D- and L-glutamic acid hydrochloride were respectively recovered from the two crystallizing tanks after three hours, and had specific rotations of $[\alpha]_D^{20} = -24.0°$ (93.6% optical purity) and $$[\alpha]_D^{20} = +24.2°$$

(94.5% optical purity).

*Example 11*

A solution saturated with 27 percent racemic glutamic acid at 70° C. and pH 4.3 was cooled to 65° C. and fed at a rate of 2 liters per minute to two six-liter crystallization tanks as described in Example 7. The tanks were kept at 65° C. and were initially supplied with seed crystals as described in Example 7. The overflowing mother liquors from both tanks were combined and recirculated. The content of free undesired antipode was kept at and below 4.8 percent. The circulating solution was kept supersaturated with DL-glutamic acid by feeding crystals of DL-glutamic acid monohydrate to each crystallization tank at a rate of 950 grams per hour.

The operation was interrupted after three hours. The crystals withdrawn from the crystallization tanks were dried as described in Example 7. Each 500 gram batch of optically active glutamic acid had grown to 3,000 grams. The specific rotation of the D-glutamic acid was $[\alpha]_D^{20} = -29.9°$ (optical purity 93.5%), that of the L-glutamic acid was $[\alpha]_D^{20} = 30.2°$ (optical purity 94.5%).

FIG. 7 illustrates the following experimental results:

An aqueous solution, which has contained 21% of racemic glutamic acid and has been adjusted to pH 4.5 by the addition of sodium hydroxide, is divided to introduce at 55° C. into two resolution tanks, which are of the same type as shown in FIG. 2 and the content of the tanks are 6 l. each, at a flow rate of 30 l./hr. each. The combined solution overflowed from these two tanks is recycled through a feed tank of racemic glutamic acid, a pump, a heater and cooler, and finally divided to feed into the two resolution tanks. Thus a complete system of the optical resolution is set up. To start with the operation each 2000 g. of D- and L-glutamic acid seed crystals are added, respectively, in the resolution tanks. The racemic glutamic acid is introduced into the feed tank continuously at a rate between 170 g./hr. and 3500 g./hr. (The free antipode concentration varies with this feed rate.) During the operation, 400 to 1000 g. each of the seed crystals of D- and L-glutamic acid are added at intervals of one hour, and the crystals in the tanks are drawn out so as to keep the amount of crystals in the tanks at about 2000 g. each. (The optical purity of the grown crystals varies with this amount of added seed crystals.) Thus, the resolution is carried out until the optical purity of the increment of the product reaches to a certain value and the concentration of the free antipode in the resolution tank at that time is analyzed. FIG. 7 shows the relationship between the thus obtained optical purity and the free antipode concentration.

All substances having a racemic form whose crystals are conglomerates of crystals of the optically active forms are capable of being resolved by preferential crystallization of one enantiomorph from the supersaturated solution of the racemate on corresponding seed crystals, and are thus capable of being resolved by our method.

While the invention has been described with particular reference to specific embodiments, it is to be understood that it is not limited thereto, but is to be construed broadly and restricted solely by the scope of the appended claims.

What is claimed is:

1. A method of optically resolving a racemate of an amino acid selected from the group consisting of glutamic acid, glutamic acid hydrochloride, and threonine, said racemate forming a conglomerate of crystals of the two enantiomorphs thereof which comprises:
   (a) keeping a supersaturated solution of said racemate in contact with seed crystals of one of the enantiomorphs thereof in a crystallization zone until a portion of the one enantiomorph in said racemate is preferentially deposited on said seed crystals; and
   (b) continuously replenishing the supersaturated racemate solution in said zone at a rate sufficient to keep the concentration of the optically active free form of the other enantiomorph in the solution in said zone below five percent of the combined concentration of said other enantiomorph and of said racemate.

2. A method as set forth in claim 1, wherein said seed crystals are retained in said crystallization zone while said solution is being replenished.

3. A method as set forth in claim 1, which further comprises agitating said solution in said zone at a rate sufficient to suspend seed crystals in said solution.

4. A method as set forth in claim 1, wherein said solution is being replenished by continuously feeding supersaturated racemate solution to said zone while withdrawing therefrom a solution containing said other enantiomorph in optically active free form.

5. A method as set forth in claim 1, wherein said seed crystals have a terminal settling velocity in said supersaturated solution of not less than 0.2 meter per minute and not substantially more than four meters per minute, said solution being replenished by being fed continuously to the bottom of said zone and withdrawn from the top of said zone, said solution being fed to said bottom and withdrawn from said top at such a rate that the vertical velocity of the solution in said zone is more than 20 percent of the terminal settling velocity of the largest one of said seed crystals in said zone, and not more than 60 percent of the terminal velocity of the smallest one of said seed crystals, whereby said crystals form a fluidized bed in said solution, and said portion of said one enantiomorph is preferentially deposited on the crystals of said bed.

6. A method as set forth in claim 5, wherein the terminal settling velocity of said seed crystals is at least one meter per minute.

7. A method as set forth in claim 5, which further comprises withdrawing said seed crystals from said zone when the settling velocity of said seed crystals is increased to substantially the vertical velocity of said solution by the deposition of said one enantiomorph.

8. A method as set forth in claim 5, wherein said seed crystals are supported on inert carrier bodies.

9. A method as set forth in claim 1, wherein the supersaturated solution in said zone is replenished by feeding fresh supersaturated racemate solution to said zone in a predetermined amount, while withdrawing from said zone a corresponding amount of solution containing said concentration of said other enantiomorph in the optically active free form; keeping said corresponding amount in contact with seed crystals of said other enantiomorph in another crystallization zone until a portion of said other enantiomorph in said corresponding amount of solution is preferentially deposited on the latter seed crystals and withdrawing said corresponding amount of solution from said other crystallization zone before the concentration of said one enantiomorph in the free optically active form thereof in said other zone exceeds five percent of the combined concentration of said one enantiomorph and of said racemate.

10. A method as set forth in claim 1, wherein said seed crystals have a terminal settling velocity in said supersaturated solution of not less than 0.6 meter per minute and not substantially more than twelve meters per minute, said solution being replenished by continuous feeding of fresh super-saturated solution of said racemate to said zone, and by continuous withdrawal of partly spent supersaturated solution from said zone, the supersaturated solution in said zone being agitated at a rate sufficient to suspend said crystals in said solution while said portion of said enantiomorph is preferentially deposited thereon.

11. A method of optically resolving a racemate of an amino acid selected from the group consisting of glutamic acid, glutamic acid hydrochloride, and threonine, said racemate forming a conglomerate of crystals of the two enantiomorphs thereof which method comprises:
(a) continuously feeding a supersaturated solution of said racemate to two separate crystallization zones;
(b) agitating said solution in each of said zones;
(c) suspending seed crystals of the two enantiomorphs of said racemate in said zones respectively by said agitating, whereby said seed crystals grow by selective deposition of the respective enantiomorph from supersaturated solution;
(d) continuously withdrawing said solution from each of said zones at substantially the same rate at which the solution is being fed thereto while retaining said seed crystals in the respective zones, said rate being sufficient to make the concentration of the enantiomorph different from the seed crystals in the respective zone and present in the optically active free form smaller than five percent of the combined concentration of the racemate and of said different enantiomorph in the solution withdrawn from said zone.

12. A method as set forth in claim 11, wherein said racemate solution is being fed sequentially to said two zones, the solution withdrawn from one of said zones being fed to the other zone.

References Cited by the Examiner
UNITED STATES PATENTS

| 2,902,520 | 9/1959 | Chuffart | 260—534 |
| 2,940,990 | 1/1960 | Ogawa | 260—534 |
| 2,984,684 | 5/1961 | Fike | 260—534 |
| 2,987,543 | 6/1961 | Purvis | 260—534 |

LORRAINE A. WEINBERGER, *Primary Examiner.*

LEON ZITVER, *Examiner.*

D. P. CLARKE, B. EISEN, A. P. HALLUIN,
*Assistant Examiners.*